(12) United States Patent
Gillmore et al.

(10) Patent No.: US 7,648,015 B2
(45) Date of Patent: Jan. 19, 2010

(54) MULTI-SECTION DISCHARGE CHUTE

(75) Inventors: Benjamin J. Gillmore, Rochester, MN (US); Bryan S. Datema, Rochester, MN (US); Randy K. Bailey, Rochester, MN (US); George Altounian, Rochester, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 105 days.

(21) Appl. No.: 11/964,246

(22) Filed: Dec. 26, 2007

(65) Prior Publication Data

US 2009/0050438 A1    Feb. 26, 2009

Related U.S. Application Data

(63) Continuation-in-part of application No. 11/895,134, filed on Aug. 23, 2007.

(51) Int. Cl.
  *B65G 11/00* (2006.01)
(52) U.S. Cl. .............................................. 193/5; 366/68
(58) Field of Classification Search ..................... 193/5, 193/6; 366/68
  See application file for complete search history.

(56) References Cited

U.S. PATENT DOCUMENTS

| | | | | |
|---|---|---|---|---|
| 1,031,829 A | * | 7/1912 | Adams ......................... | 193/16 |
| 2,815,840 A | * | 12/1957 | Mesanko ....................... | 193/6 |
| 2,968,382 A | * | 1/1961 | Oury ........................... | 193/10 |
| 3,684,645 A | | 8/1972 | Temple et al. | |
| 4,634,285 A | | 1/1987 | Newberry | |
| 4,711,334 A | | 12/1987 | Barry et al. | |
| 5,035,313 A | | 7/1991 | Smith | |
| 5,056,641 A | | 10/1991 | Loefke et al. | |
| 5,178,252 A | | 1/1993 | Smith | |
| 5,184,706 A | | 2/1993 | Christenson | |
| 5,228,478 A | | 7/1993 | Kleisle | |
| 6,041,907 A | * | 3/2000 | Bonnette ....................... | 193/6 |
| 6,367,606 B1 | * | 4/2002 | Skalla et al. ................... | 193/6 |
| 6,918,481 B2 | * | 7/2005 | Quigley et al. ................ | 193/6 |
| 7,178,657 B1 | | 2/2007 | Hafen et al. | |
| 2003/0226737 A1 | | 12/2003 | Quigley et al. | |
| 2004/0222255 A1 | | 11/2004 | Neiffer | |

OTHER PUBLICATIONS

International Search Report and Written Opinion dated Sep. 5, 2008.

* cited by examiner

*Primary Examiner*—Mark A Deuble
(74) *Attorney, Agent, or Firm*—Nikolai & Mersereau, P.A.; C. G. Mersereau

(57) ABSTRACT

A multi-section chute of a type suitable for directing mixed concrete compositions from a discharge end of a transit concrete mixer truck to a desired receiving location. The chute includes a plurality of elongate chute sections, each having a wall with a low friction concave inter-surface configuration and a convex outer configuration wherein each chute section includes a pair of longitudinal channel shapes along and integral to longitudinal edges of the wall and a central longitudinal rib, the channel shapes and the rib re-enforcing the chute section against longitudinal bending, and a fastening assembly for removably joining the plurality of chute sections together in a consecutive longitudinal arrangement and wherein the plurality of elongate chute sections further comprise cooperating nesting configurations that enable formation of a compact stable interconnecting nesting storage arrangement.

20 Claims, 20 Drawing Sheets

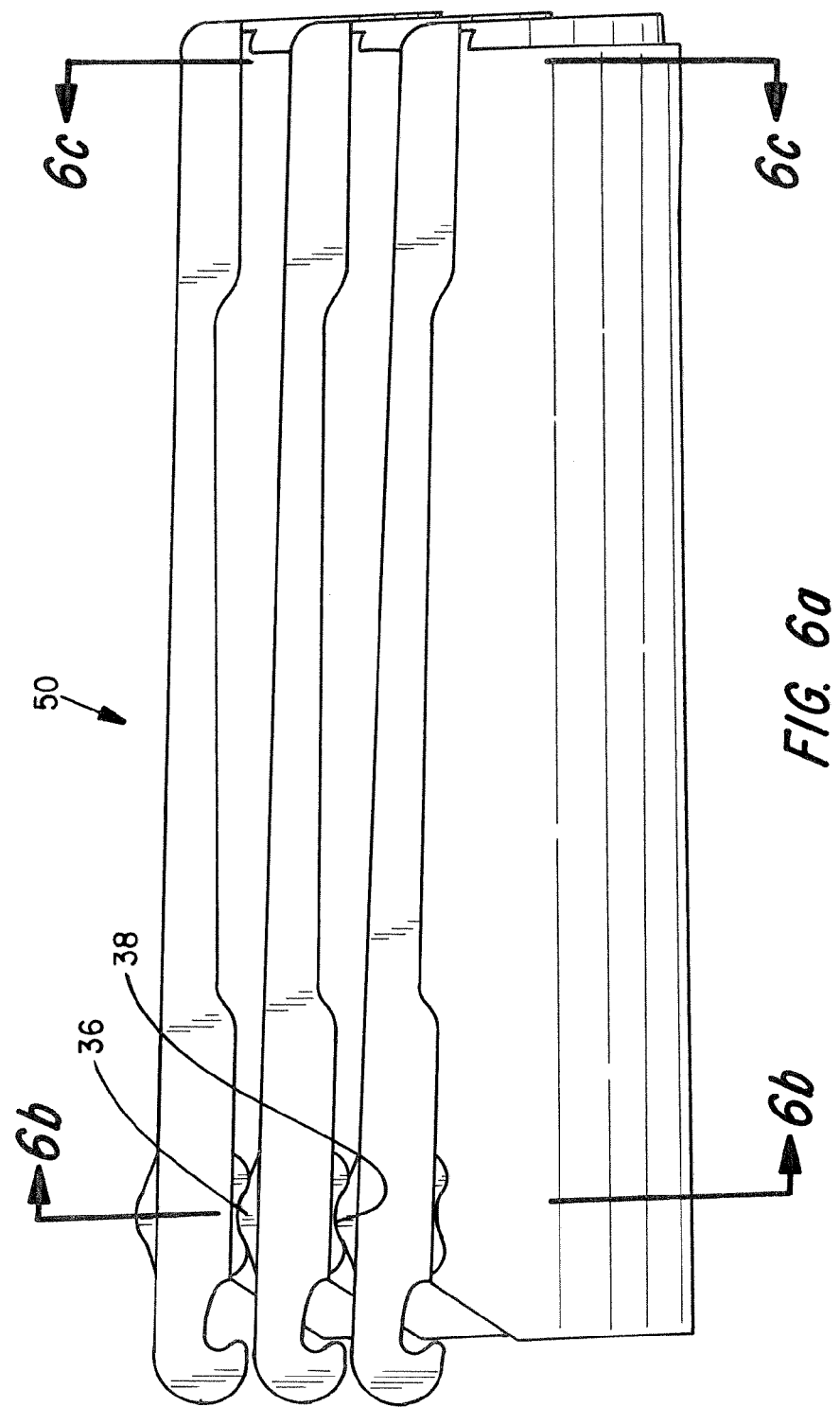

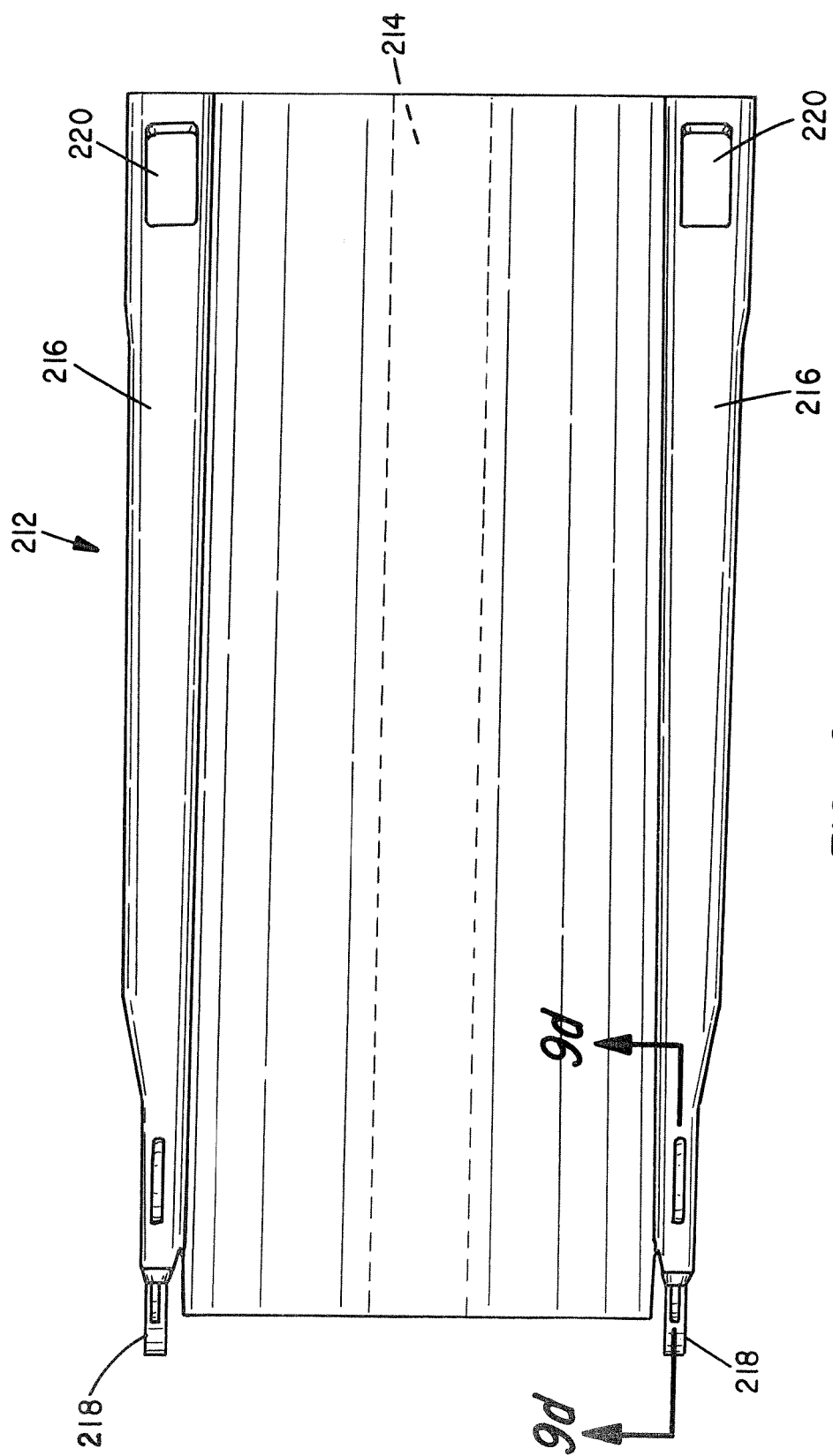

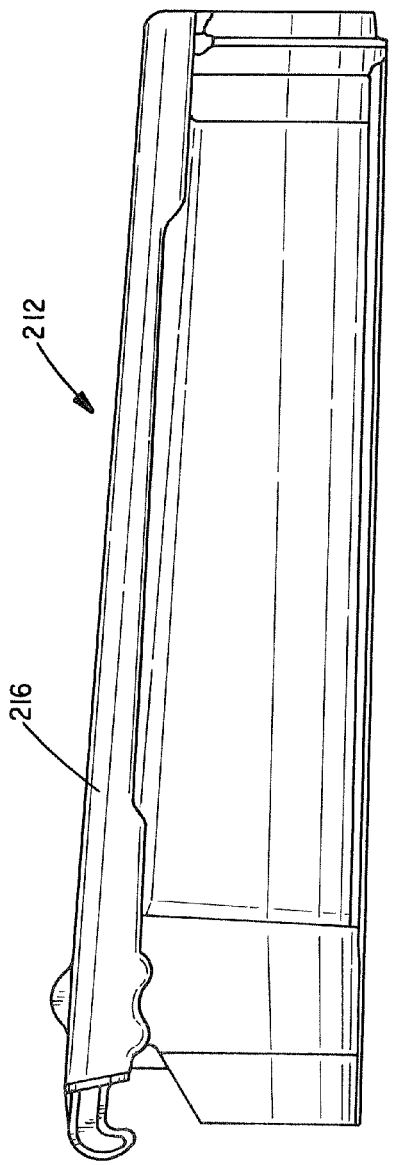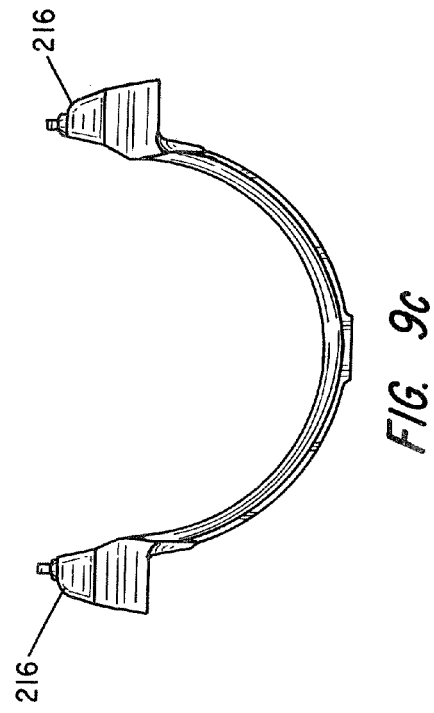
FIG. 9b
FIG. 9c

MULTI-SECTION DISCHARGE CHUTE

CROSS-REFERENCED TO RELATED APPLICATIONS

This application is a continuation-in-part of application Ser. No. 11/895,134, filed Aug. 23, 2007 and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates generally to mobile systems for mixing and dispensing concrete and, more particularly, to a lightweight discharge chute assembly for offloading concrete mobile systems which includes a plurality of sections that are readily handled for assembly and disassembly and which have integral nesting/stacking features which enable stable compact storage and shipping configurations. The discharge chute assembly is also useful for offloading a variety of other materials and is adaptable for use with other concrete mixing and dispensing systems such as barge-mounted or stationary concrete mixers.

II. Related Art

Transit or mobile concrete mixing trucks which carry large mixing drums are well known and have been used extensively in the construction industry for preparing and transporting concrete to job-site locations and discharging the concrete into forms or containers for further transport. An important part of this operation involves the discharging of concrete from the mixing drum into the forms, other molding structures or other transporting containers. In this regard, most mixing trucks are equipped with a side-to-side pivoting main discharge chute section which is located beneath a charge/discharge opening at one end of the drum. The discharge chute further normally contains a pivotally connected second chute section which folds out from the main chute section attached thereto by hinges. Additional chute sections have been carried on such trucks which can be hooked together and onto the end of the hinged second chute section to provide variations in the length of the discharge chute as needed.

The chute extension sections have traditionally been fabricated from heavy gauge steel in order to withstand the cantilevered stresses associated with carrying amounts of heavy concrete mix. Such metal chute components, however, are heavy for operators to handle, may tend to corrode and are subject to abrasive wear which results in roughened surfaces which further impair efficiency. Additionally, the steel extension chutes wear thin and become weak from the abrasion. Steel chutes are also subject to corrosion and scaling.

Non-metal chute components are shown, for example, in U.S. Pat. No. 5,056,641 to Loefke et al, assigned to the same assignee as the present invention and which is incorporated herein by reference for any purpose. These sectional components feature a multi-ribbed polymer construction and are releasably joined together using a hinge-type projection and socket system with an associated rotating cam locking arrangement. While this system is met with a certain amount of success, there has remained a need for a multi-section concrete discharge chute arrangement that is not only even lighter in weight, less expensive and smooth-surfaced, but one in which the sections are more easily handled by workers and one which simplifies the reinforced construction of the chute sections. In addition, it would be desirable that the sections of the multi-section arrangement be configured to interlock in a nesting/stacking configuration such that the disassembled system is more stable and convenient to store and ship.

SUMMARY OF THE INVENTION

By means of the present invention, there is provided a multi-section chute of a type suitable for directing mixed concrete compositions from a transit concrete mixing truck or other mixing device such as a stationary mixer to a desired receiving location. The multi-section chute includes a plurality of elongate chute sections, each chute section having a generally trough or U-shaped arcuate wall, which may be a circle segment, with a low friction concave inter-surface configuration and a corresponding convex outer configuration. The sections may be fabricated from any suitable light weight non-metallic material or combination of materials and may be of a layered structure. The sections may be of any suitable length and are generally from about 2 feet to about 6 feet in length, and typically about 4 feet in length.

In one preferred embodiment, each chute section includes a pair of flanking longitudinal channel shapes along and integral to the edges of the u-shaped wall, which act as handles, stiffeners and contain a fastening assembly in the form of latching devices for attaching the sections together in a continuous arrangement. In the normal disposition of the chute, the U-shape is directed generally upward with the open side of associated longitudinal side channel shapes directed downward to further provide extended edges for convenient hand gripping and lifting of each chute section by hand. Each chute section also contains a single central stiffening rib, which, with the two longitudinal channel sections, further reinforces the chute section against longitudinal bending.

A fastening assembly is provided for removably joining the plurality of chute sections together in a consecutive longitudinal arrangement to form a continuous trough. Each of the plurality of elongate chute sections further includes cooperating interlocking protrusions or nubs and recesses toward one end, which, with matching flat surface areas along the interior and exterior surfaces, provide a nesting/stacking configuration that enables stacked sections to interlock to form a compact storage and shipping arrangement.

According to another aspect of the invention, the plurality of sections incorporate a simple and convenient fastening assembly for removably joining the plurality of chute sections, together in consecutive longitudinal arrangement which features a simple hook and pin system in which abutting portions of the chute sections cooperate to provide an easily disassembled, but positive, gravity locking fastening arrangement. The fastening arrangement may be made compatible with existing steel chute extensions allowing interchangeability with steel extensions. A sleeve can be added that fits on top of the pin to further alleviate stresses in the hook area.

BRIEF DESCRIPTION OF THE DRAWINGS

In the drawings, wherein like numerals depict like parts throughout the same:

FIG. 6a illustrates a plurality of chute sections in accordance with the invention in stacked arrangement;

FIG. 9a-9c are top, side and end views, respectively, of a chute section embodiment using an alternate interconnecting arrangement in accordance with the invention;

FIG. 9d is an enlarged partial sectional view taken along line 9d-9d of FIG. 9a;

DETAILED DESCRIPTION

Figure 1A:
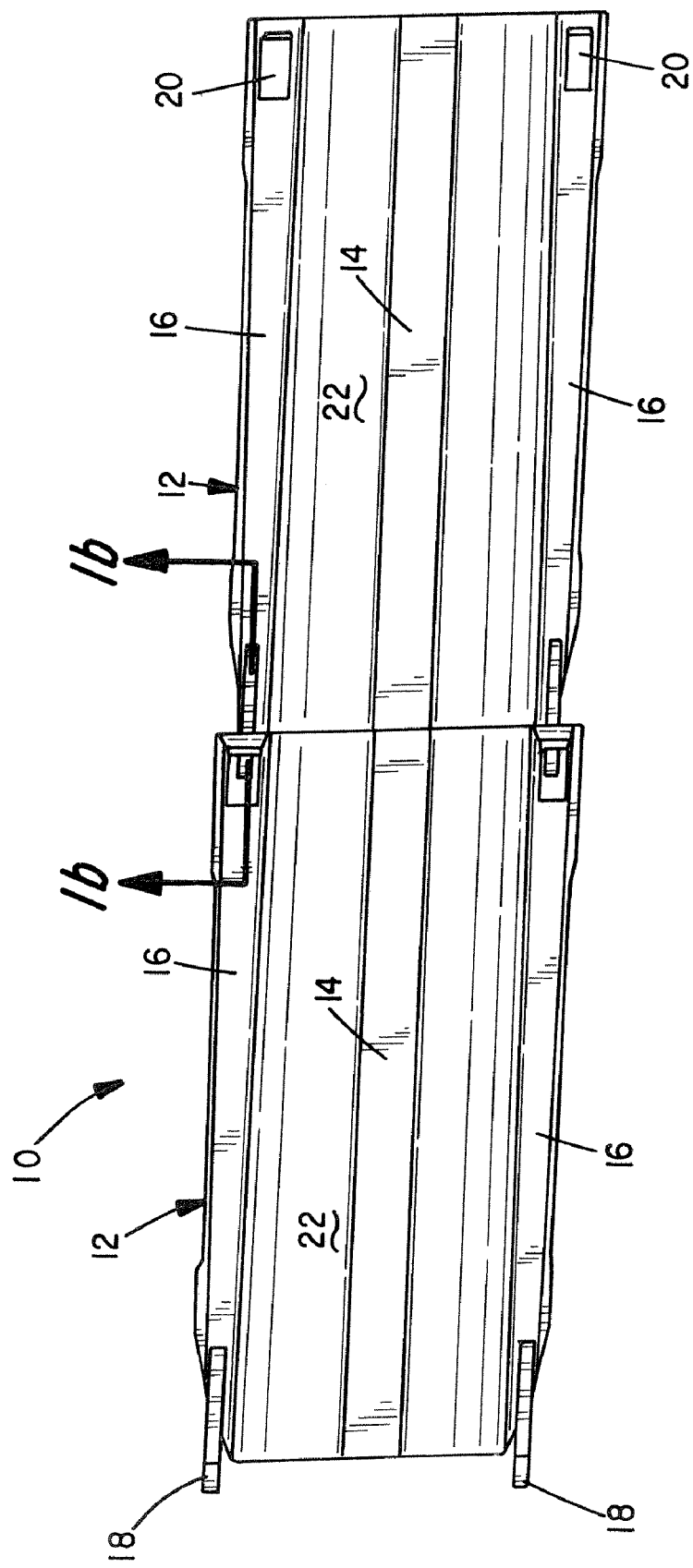
FIG. 1*a* illustrates a bottom view showing a pair of chute sections fastened together.
Figure 1B:
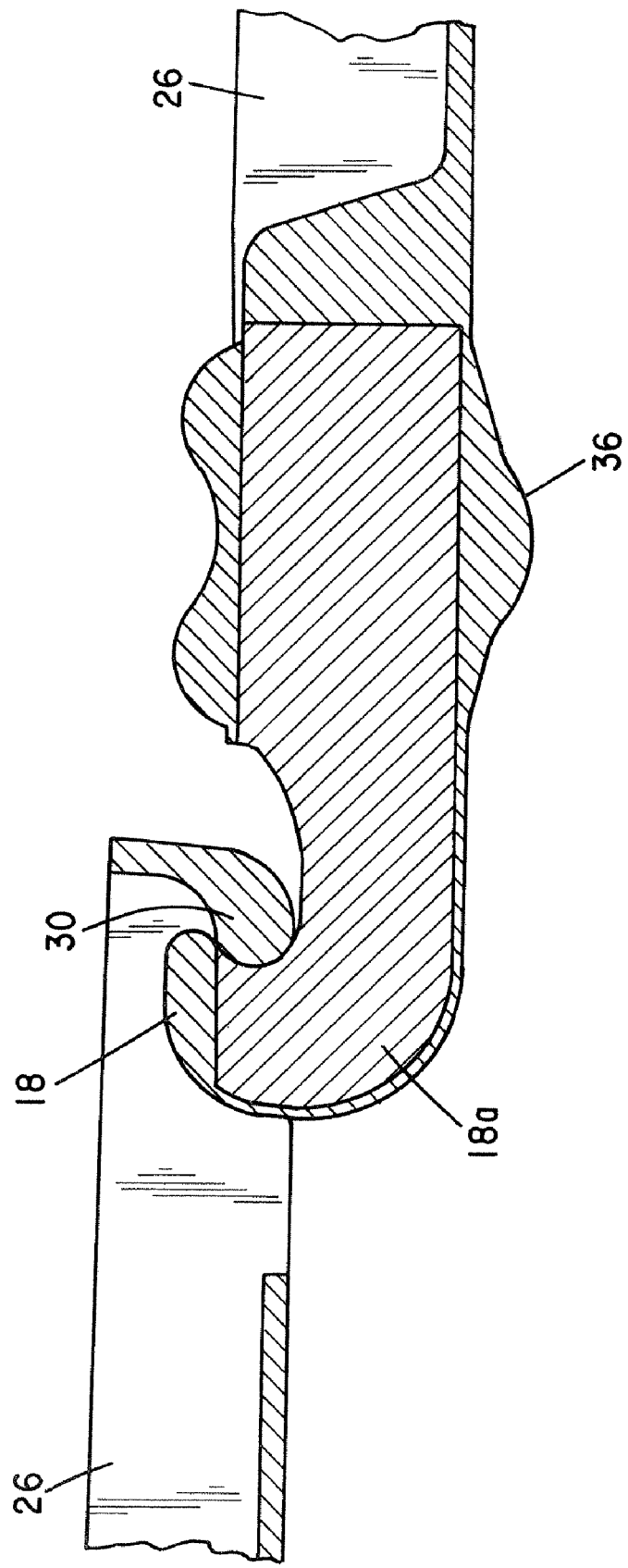
FIG. 1*b* illustrates a reinforced hook detail partially in section taken along 1*b*-1*b* of FIG. 1*a;*
Figure 2:
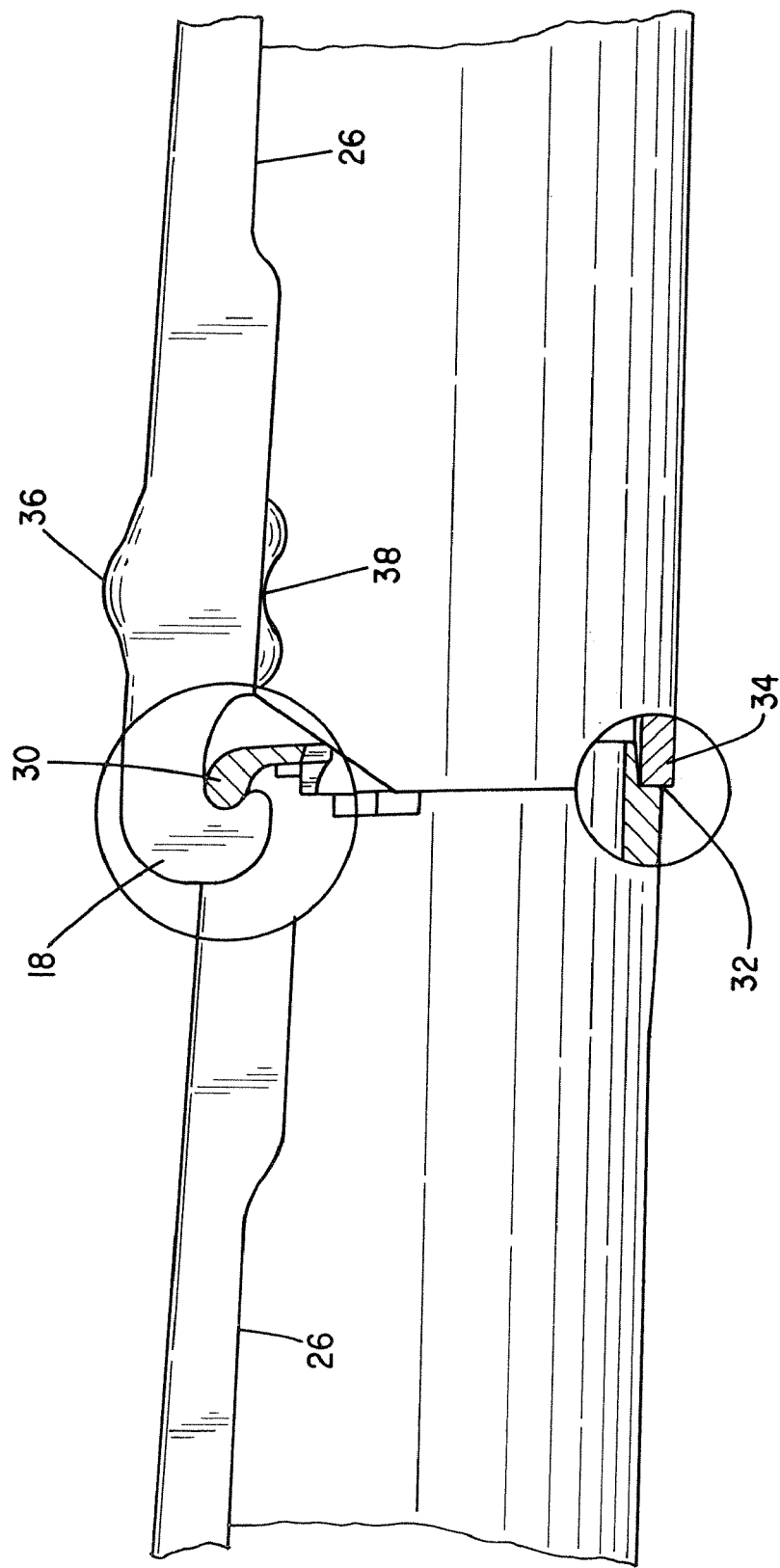
FIG. 2 is a fragmentary side view partially in section that reveals details of a fastening arrangement in section.
Figure 3A:
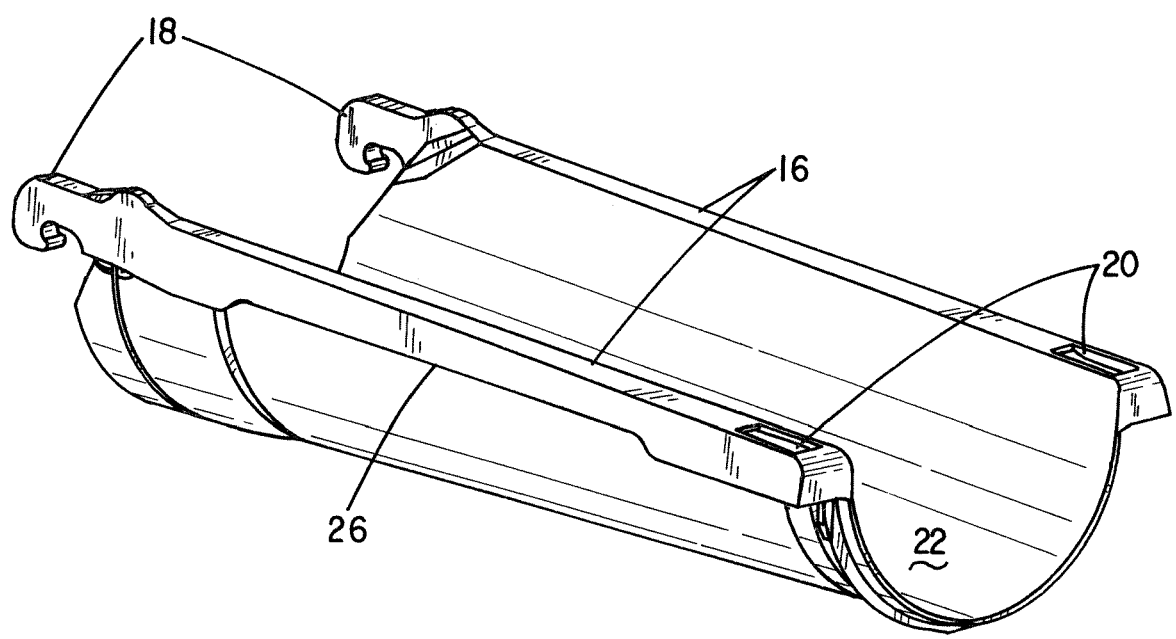
FIGS. 3a and 3b illustrate top perspective and top plan views of a chute section in accordance with the invention.
Figure 3B:
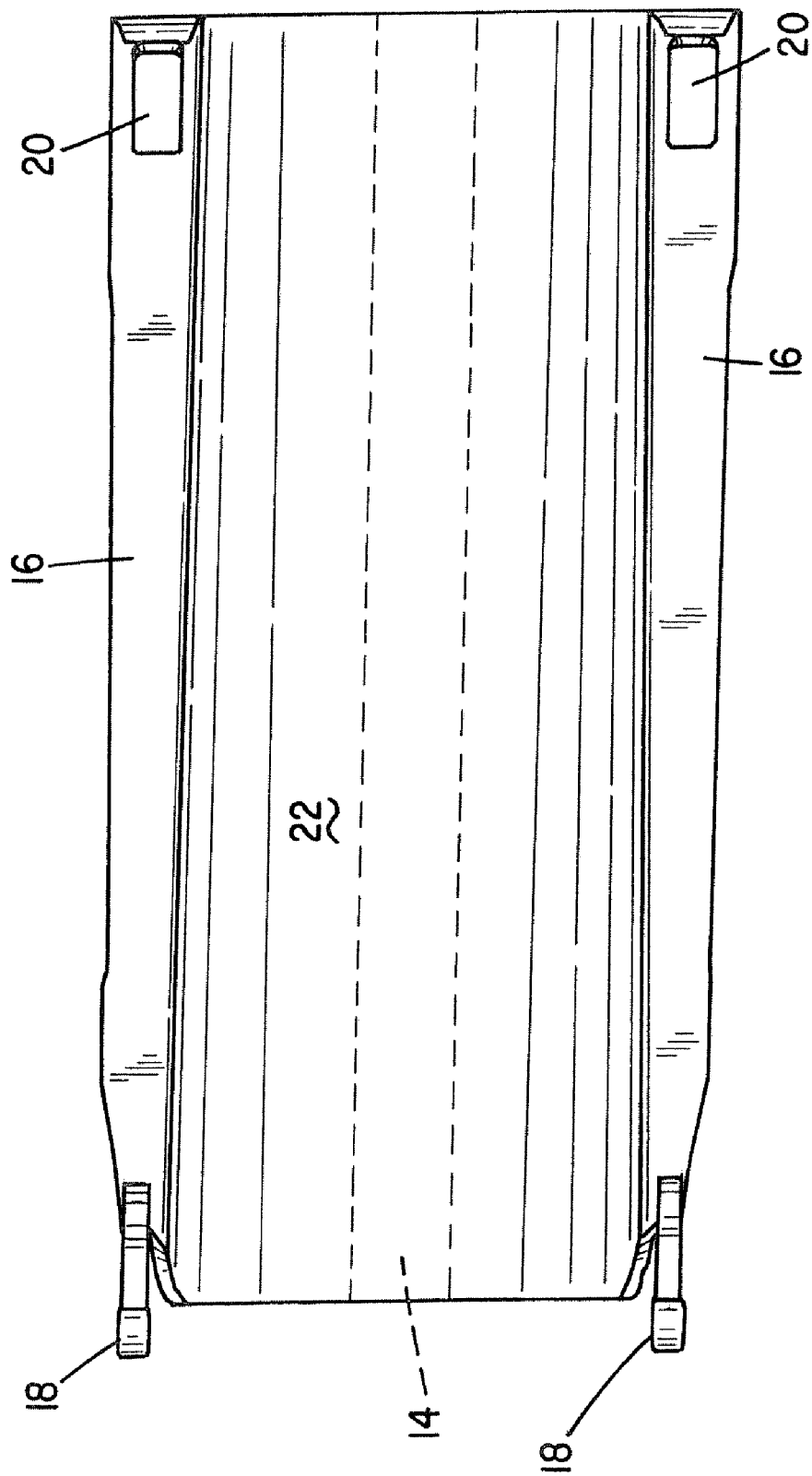

The following detailed description describes one or more embodiments of the multi-section chute in accordance with the principles of the invention. Each embodiment described is meant to illustrate an example of the inventive concepts and is not meant to be limiting in any respect as variations may occur to those skilled in the art which are well within the confines of the inventive concepts.

FIGS. 1-5d generally depict the multi-section chute system of the present invention. FIG. 1a depicts a bottom view of a two-section chute assembly 10 which includes a pair of chute sections 12, each having an integral central longitudinal reinforcing rib section 14. A pair of integral longitudinal generally open-hollow channel shapes 16 are provided flanking the open chute sections along the longitudinal edges thereof which resemble side moldings and each of which includes an attaching hook 18 at one end thereof and a hook receiving opening or socket 20 at the other end. FIG. 1b illustrates a reinforcing layer 18a in the attaching hook 18.

Figure 8:
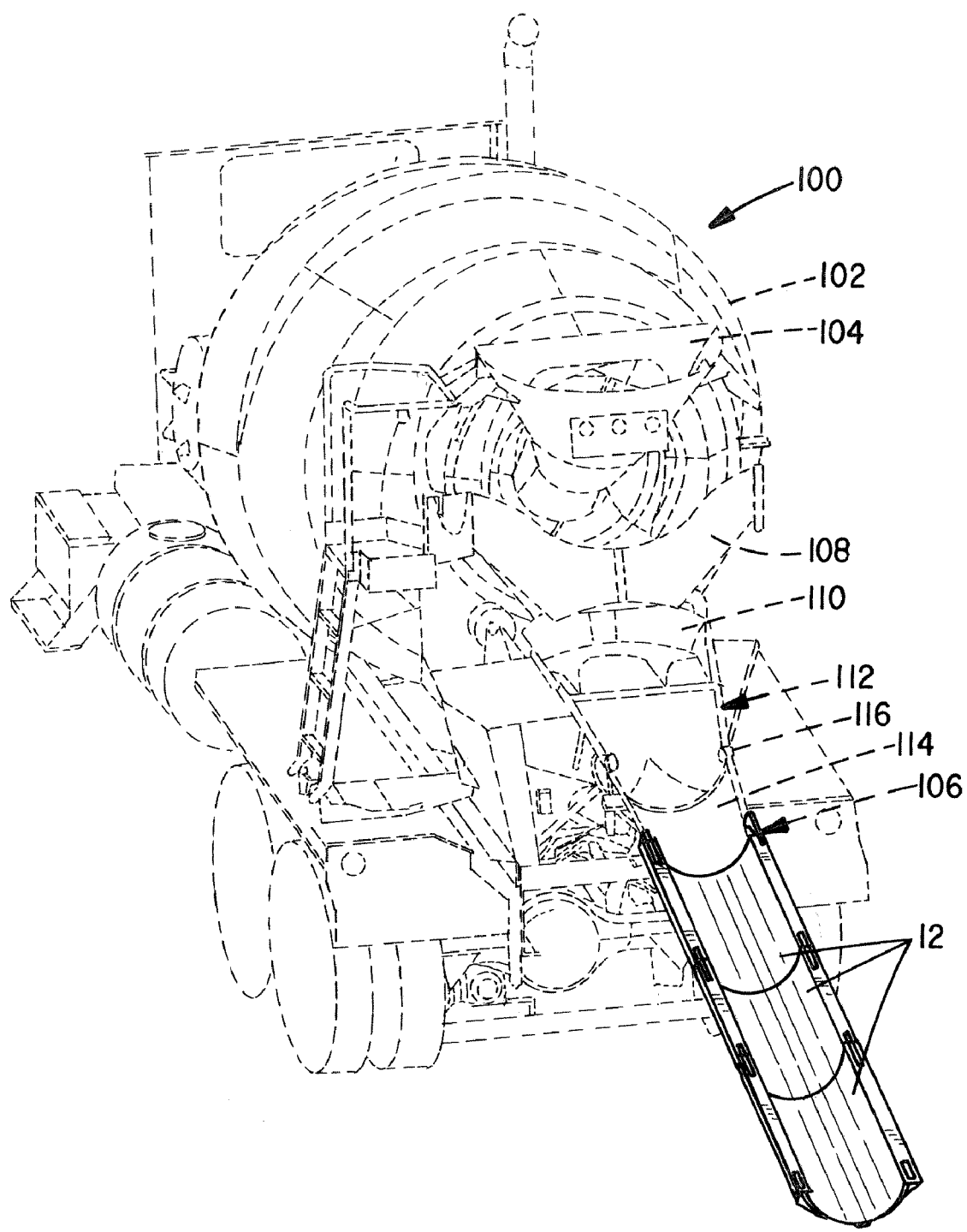
FIG. 8 is a perspective view of a transit concrete mixing and delivery vehicle system including a chute assembly in accordance with the invention.
Figure 9E:
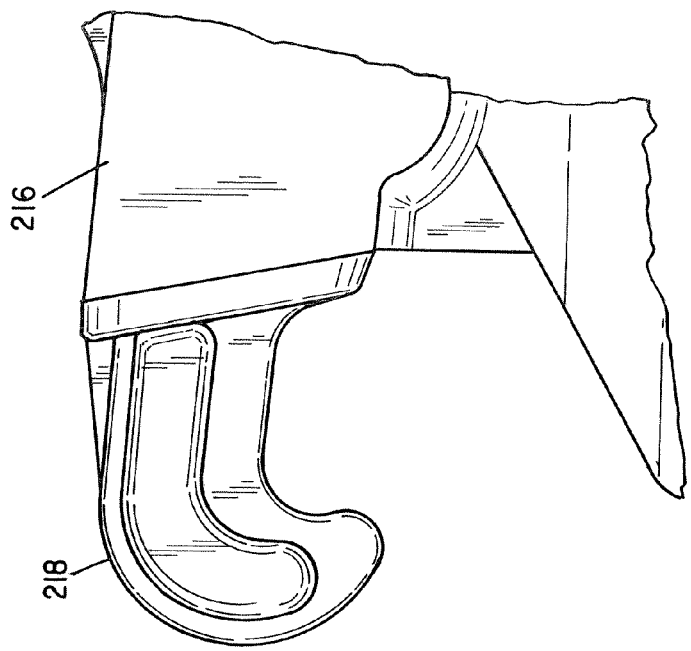
FIG. 9e is an enlarged view of a detail circled at "e" in FIG. 9b.
Figure 9D:
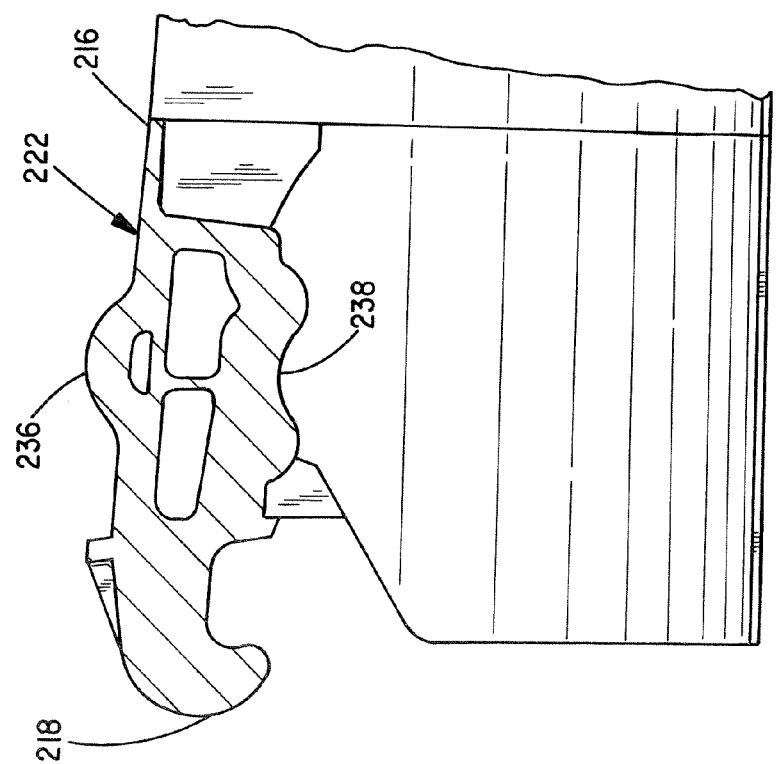
Figure 10A:
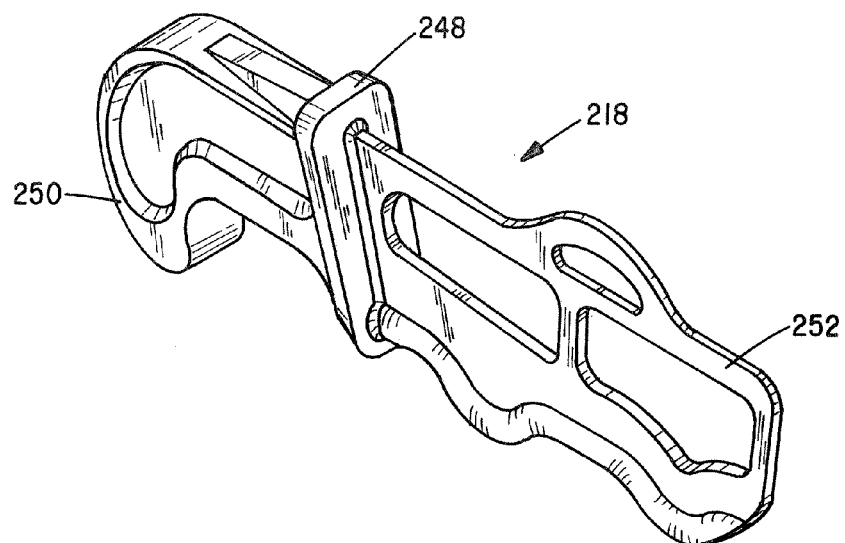
FIGS. 10a and 10b are enlarged perspective and side views, respectively, of a fastening hook illustrated in FIGS. 9a, 9b, 9d and 9e.
Figure 10B:
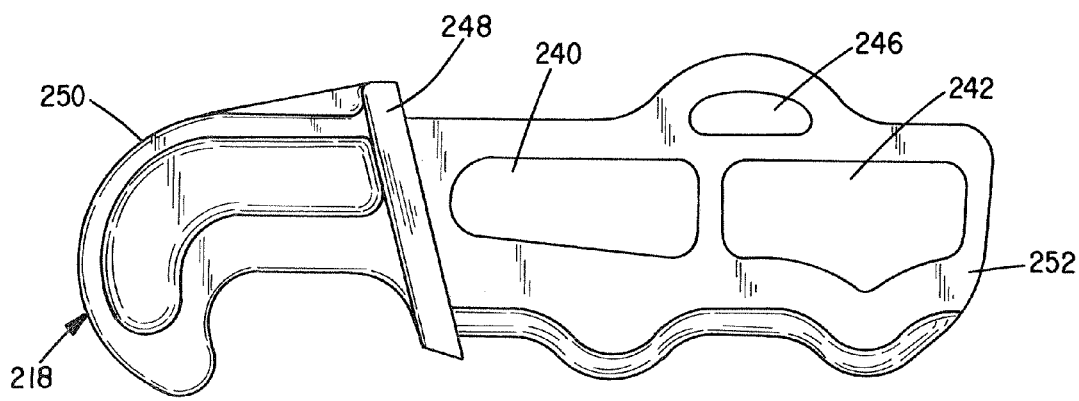

With particular reference to FIG. 8, there is shown a transit concrete mixing truck generally at 100, which includes a mixing drum 102 for mixing and dispensing concrete, a fill chute funnel device 104 for charging materials to be mixed into the mixing drum 102. A discharge mechanism is provided for guiding mixed concrete into a discharge chute assembly, generally at 106, which includes a discharge funnel guide 108 with guide curtain 110 which functions to guide discharging concrete into a permanently truck-mounted main discharge chute at 112, as is well-known in the art. The main discharge chute 112 is typically adjustably mounted with respect to the chassis of the mixing truck 100 by a pivot mechanism so that it may easily be pivoted from side to side as necessary in a well known manner to address a discharge point of interest. A second fold-over chute 114 is pivotally attached to the downstream end of the main discharge chute 112 by hinge-type joints as at 116 which may include conventional pivot pins which enable the fold-over section 114 to be folded out of the way over the main chute when not in use. When in the operating position, as shown in FIG. 8, the longitudinal axis of the fold-over section 114 is substantially parallel to that of the main discharge chute 112. Further aligned with the chute sections 112 and 114 are three sequentially attached chute sections in accordance with the invention, shown at 12. The series of extension chute sections 12 can readily be assembled and fitted together to form a longer discharge chute connected to the existing truck chutes to extend the discharge point as needed.

Figure 4A:
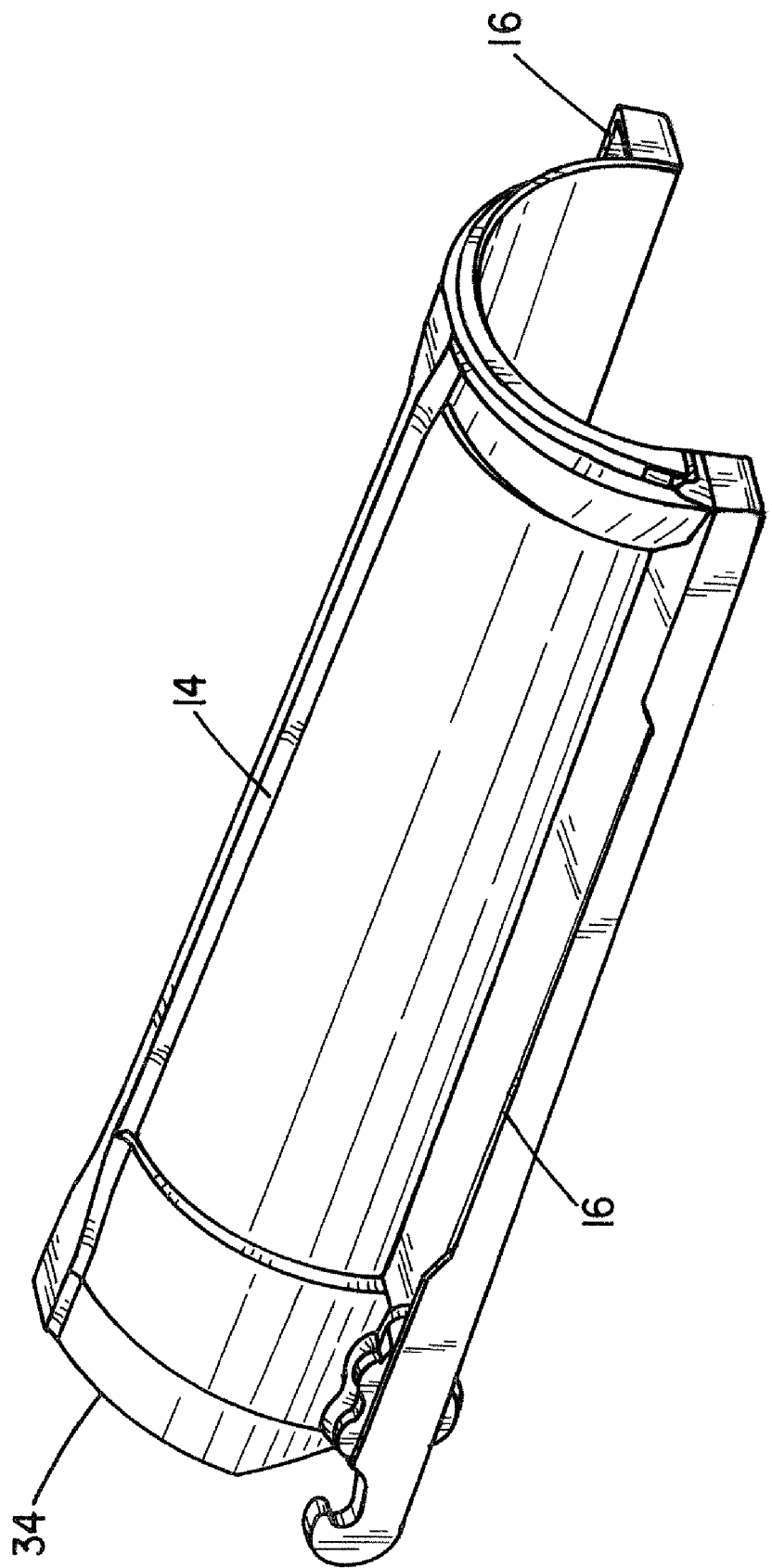
FIGS. 4a and 4b illustrate bottom perspective and bottom plan views of a chute section as in FIGS. 3a and 3b.
Figure 4B:
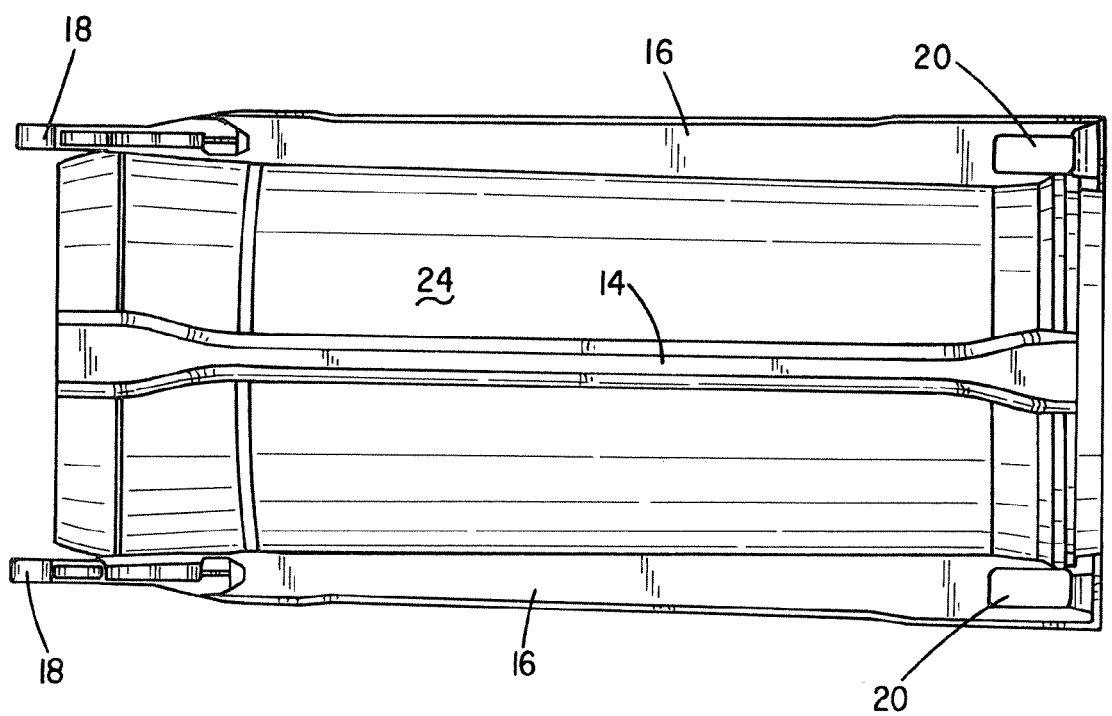
Figure 5A:
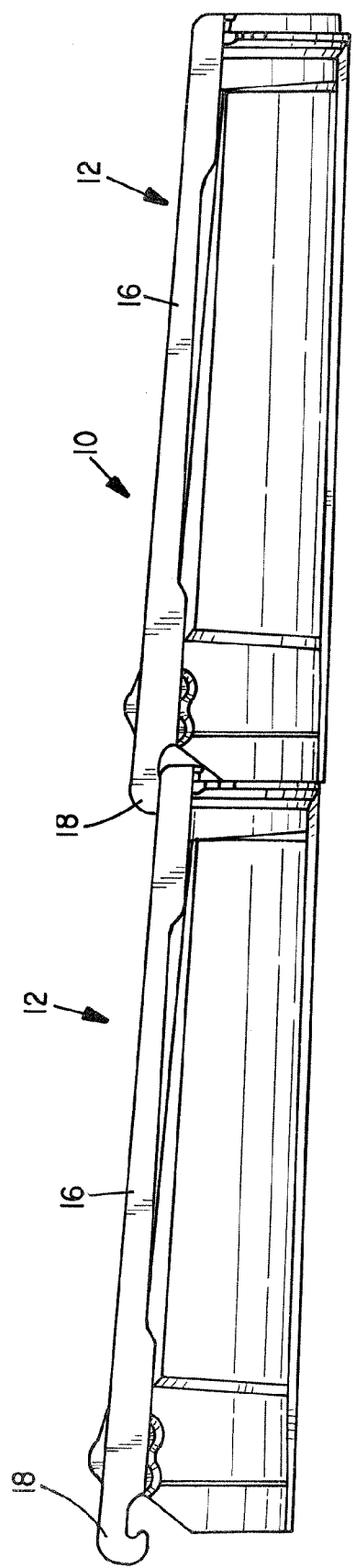
FIG. 5a illustrates a side view of a pair of chute sections in accordance with the invention as assembled together.
Figure 5B:
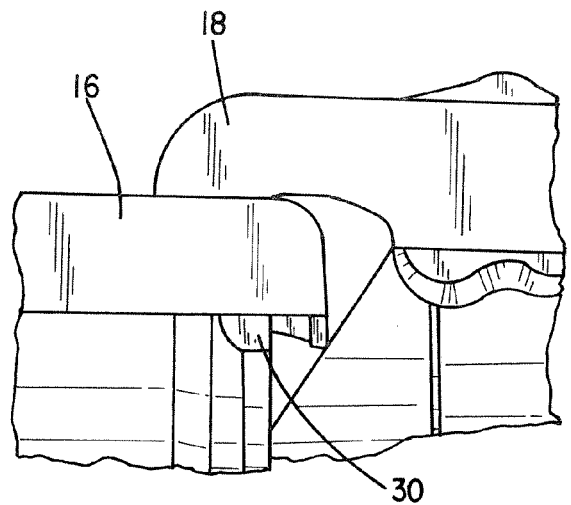
FIGS. 5b-5d illustrate greatly enlarged detail perspective views showing aspects of an interconnection technique in accordance with the invention.
Figure 5C:
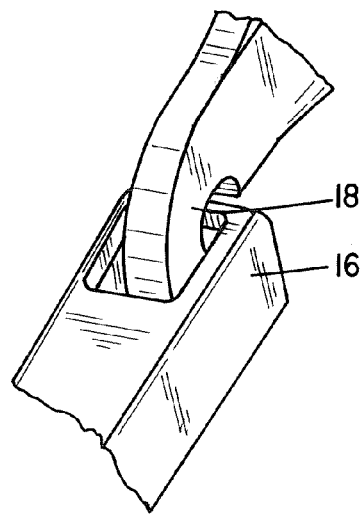
Figure 5D:
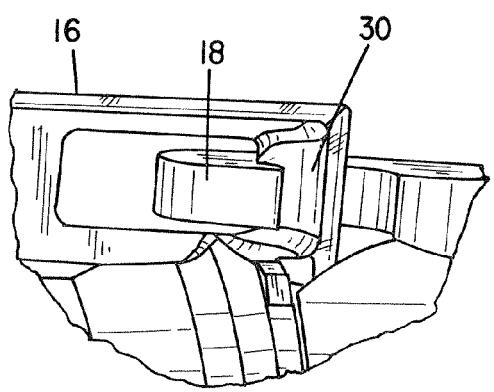

The trough-shaped chute sections 12 are of a generally arcuate curved configuration and have a concave interior surface 22 and a generally convex outer surface 24 (FIG. 4b). The generally channel-shaped side molding 16 provide excellent structural stiffening along the length of the chute sections and along with the central rib 14 they provide the necessary longitudinal reinforcement against longitudinal bending under the full concrete load. In addition, the channel shapes also provide an extended area 26 (FIG. 2) for hand gripping along the length of each section 16, which facilitates the ease of hand manipulation by an operator in assembling and disassembling a multi-section chute.

An aspect of the inventive concept involves the ease of assembly and disassembly of consecutive and end-to-end chute sections. As best seen in FIGS. 2, 3a, 4a and 5a-5d, each of the recesses or pockets is provided with a shaped pin device 30 inside the recess or pocket which is configured to receive a curved end of a corresponding hook of an adjacent chute section. The pin end or rear portion of each chute section 12 is further provided with a recessed groove 32 which is configured to receive an abutting protruding portion of the hook or front end of the next connecting chute section at 34 so that the abutting sections combine with the hook and pin upper arrangement enables gravity to lock the consecutive sections in place during use.

Figure 6B:
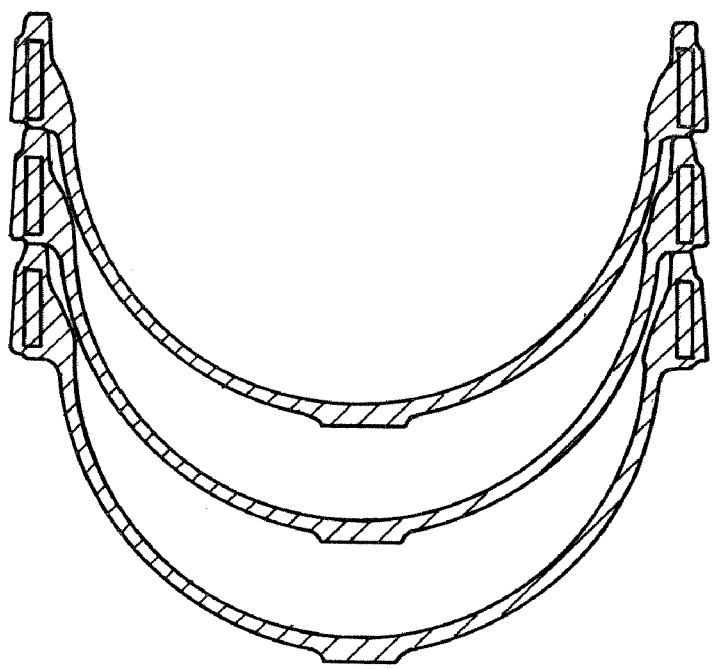
FIGS. 6b and 6c illustrate stacking features in cross section.
Figure 6C:
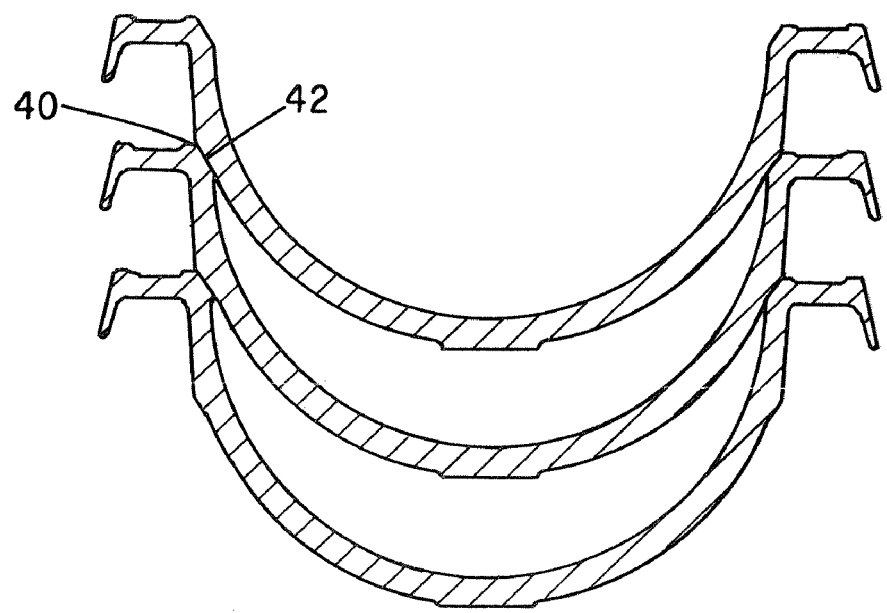
Figure 7A:
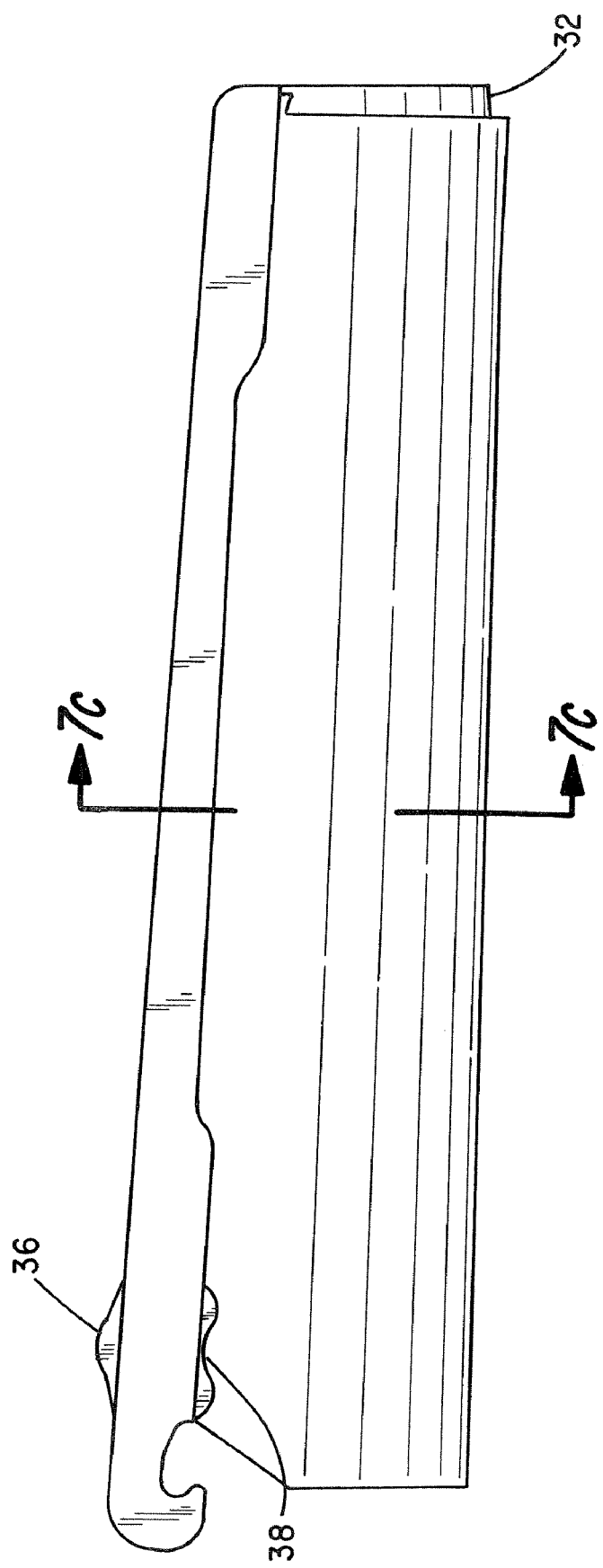
FIGS. 7a-7c illustrate side, end and sectional views of a chute section and the greatly enlarged details of FIGS. 7d and 7e illustrate interlocking and stacking aspects.
Figure 7B:
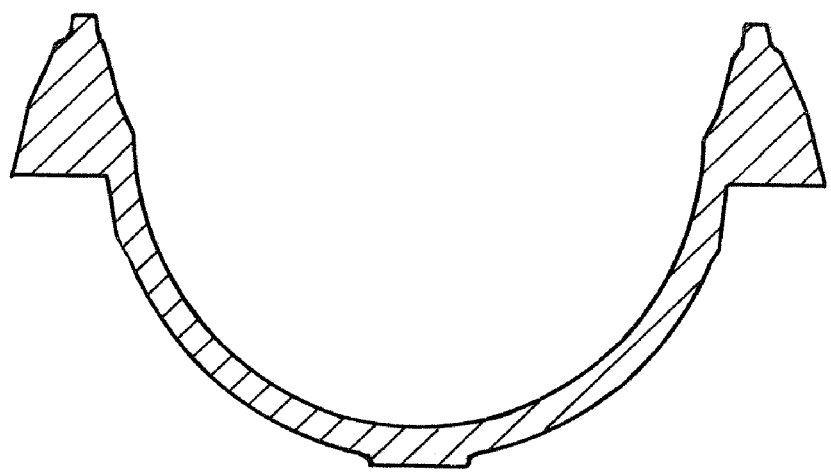
Figure 7C:
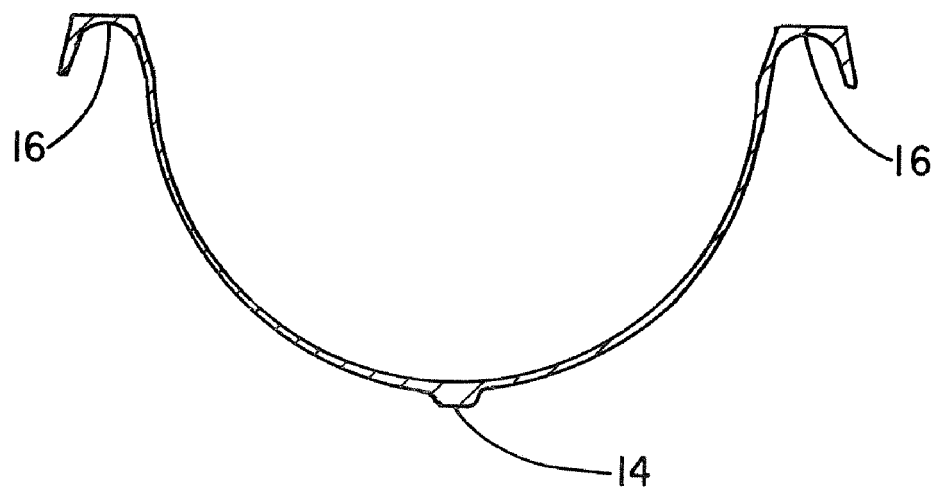
Figure 7D:
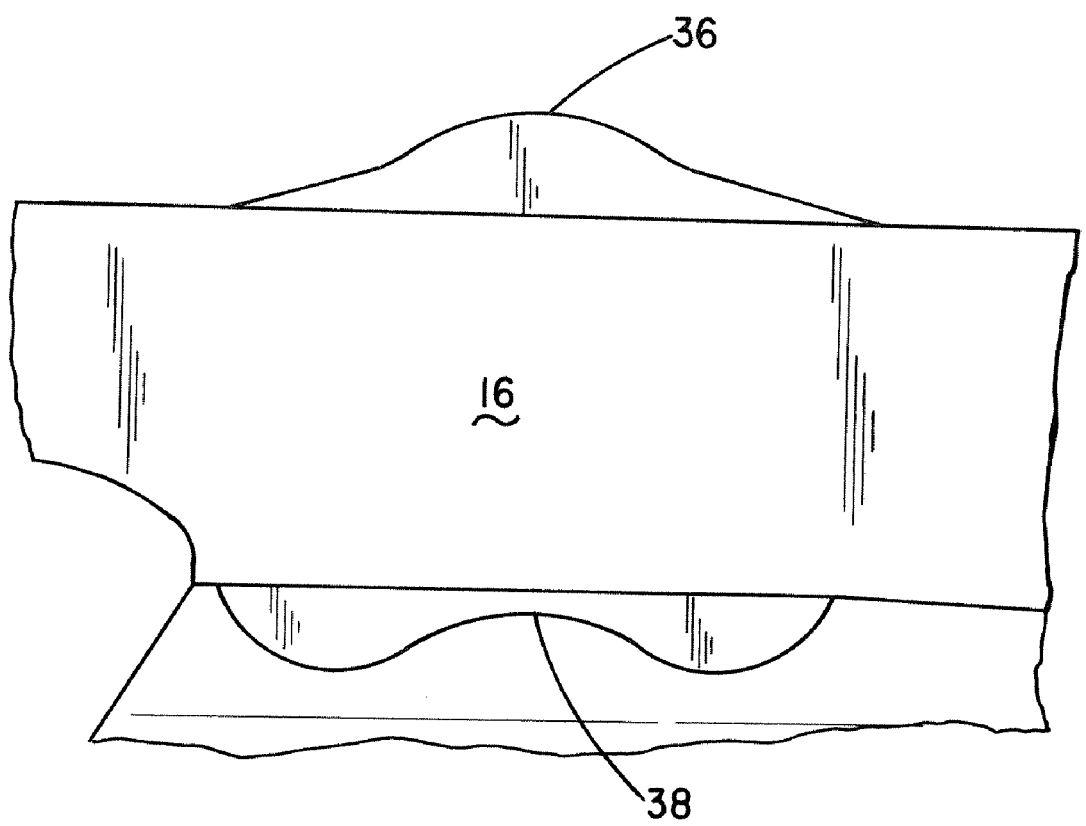
Figure 7E:
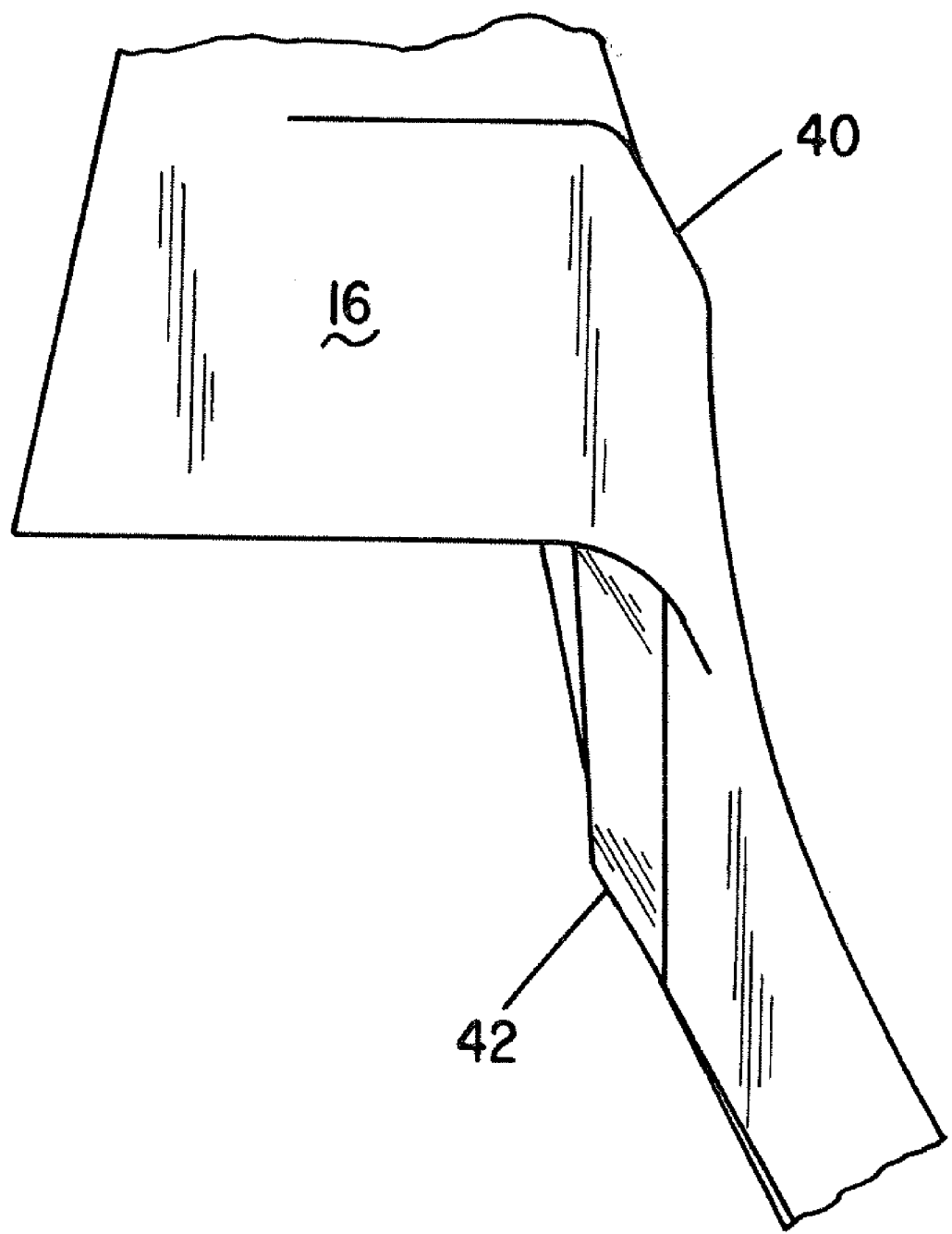

A further aspect of the multi-section concrete chute of the invention involves storage and shipping characteristics of a disassembled chute in which the individual chute sections are provided with interlocking, nesting aspects which enable stable compact storage in truck locations and compact packaging for shipment to new users. As seen in the figures, each generally channel-shaped member 16 is provided with an upward directed protrusion 36 (assuming conventional disposition) and a downward directed recess 38 is shown, for example, in the enlarged detail of FIG. 7d. The inner and outer surfaces of each of the concave/convex chute sections are further provided with corresponding mating surfaces along the length thereof including interior, generally flattened areas 40 and exterior, generally flattened areas 42 (FIG. 7e). The cooperation of these aspects is suitably demonstrated in the stacked views of FIGS. 6a-6c which show a three-section, multi-section chute disassembled and stacked in interlocking or nesting arrangement at 50. This design enables a reduced storage volume and enables smaller boxes for shipping, including overnight delivery, heretofore unavailable with prior devices and reduces storage space required on mixers where room to carry objects is often at a premium.

As indicated, while any suitable high strength, lightweight, polymeric material that is generally chemically inert to the environment can be used, the sections of the multi-section chute of the invention further are preferably fabricated from a high strength to weight ratio, lightweight isotropic, polymeric material which may or may not be fiber reinforced. Preferably, the material may be reinforced using chopped or relatively short glass fibers, possibly 1-5 inches in length (2.5-12 cm) randomly distributed in the polymer mix. In addition, the material should have a low co-efficient of shrinkage. Cross-linked or cross-linkable polymer materials are preferred with generally even molecular weight distribution between backbone and branches and include, for example, without limitation, polyurethanes, epoxy/polyurethane hybrids, vinyl ester/polyurethane hybrids, cross-linked rubber reinforced polydicyclopendiene polymers and polyamides, including many nylons, and polysiloxanes.

The structure polymer should have a flexural modulus between 200,000 psi and 3,000,000 psi, more specifically, between 500,000 psi and 1,500,000 psi. Additional re-enforcing material may be used in the rib and hook and pin areas of the chute sections. The structure may be layered using a plurality of materials. The inner top surface layer should be one combining a low coefficient of friction with a high abrasion resistance. Optionally, the surface layer may be reinforced with fillers such as milled fibers, Wollastonite, mica, etc. The preferred surface material is also one to which concrete doesn't easily adhere making use more efficient and the required cleanup easier. Materials such as MDI (diphenyl methyl diisocyanate) reacted with polytetramethylene ether glycols have no concrete adhesion. Most concrete adhesion involves a mechanical interlock between the concrete and the polymer at the interface. To reduce or eliminate this, preferably, the polymer porosity should be below 500 microinches, and more specifically between 10 and 200 microinches.

The weight and the highly alkaline and abrasive nature of concrete, of course, is an important factor in choosing the chute materials. Similar considerations are relevant regarding other materials of interest that might be offloaded using the chute of the invention.

The non-metallic chute sections of the present invention may be in-mold coated or pigmented in the mass, without fear of scaling since the non-metallics are also corrosion resistant. The chutes of the invention can provide a layered structure in which the layer just below the top abrasion resistant layer is of a different, contrasting color such that as the abrasion resistant layer is worn away. A color change occurs indicating that the chute section may need to be replaced.

With respect to the wear resistance of the top-most or abrasion resistant layer of the chute sections of the invention, preferably, the surface experiences a 10-500 mg loss per ASTM D4060 and, more preferably, between 200-300 mg loss. Preferably, the wear is represented by a loss between 200-300 mg. The flexural modulus of the chute sections of the invention should be between 200,000 psi to 1,800,000 psi, more preferably between 800,000 and 1,200,000. This yields a deflection of a fully loaded three-chute assembly at the distal end of from between 4-14 inches, more preferably, between 6-10 inches and, most preferably, between 6-8 inches. The chute sections of the invention preferably weigh between 20-30 pounds based on a 4-foot long section and are commonly between 25-29 pounds per section.

Tests conducted for two examples of materials useful in manufacturing the chute sections of the invention are shown in Table I. These represent random examples of polyurethane materials reinforced with short glass fibers. Material XM10024-97-1 included an abrasion resistant barrier layer in the form of an upper layer which, correspondingly, reduced the thickness of the reinforced layer. Material XM10024-97-2 was glass reinforced throughout. Thickness and layer combinations, of course, can be varied and results will vary accordingly within a wide range of values.

TABLE I

| Tensile Stress and Tensile Modulus at Various Temperatures (psi) ASTM D638 | | | | | | |
|---|---|---|---|---|---|---|
| Sample | −20° C. Tensile Stress | −20° C. Tensile Modulus | 25° C. Tensile Stress | 25° C. Tensile Modulus | 50° C. Tensile Stress | 50° C. Tensile Modulus |
| XM10024-97-1 | 10,666 | 959,004 | 13,269 | 801,526 | 10,917 | 752,899 |
| XM10024-97-2 | 16,744 | 1,238,334 | 17,058 | 1,205,924 | 16,793 | 1,165,639 |

| Flex Stress and Flex Modulus at Various Temperatures (psi) ASTM D790 | | | | | | |
|---|---|---|---|---|---|---|
| Sample | −20° C. Flex Stress | −20° C. Flex Modulus | 25° C. Tensile Stress | 25° C. Tensile Modulus | 50° C. Tensile Stress | 50° C. Tensile Modulus |
| XM10024-97-1 | 31,076 | 778,397 | 21,627 | 549,625 | 12,779 | 400,131 |
| XM10024-97-2 | 35,836 | 1,348,334 | 32,036 | 1,233,739 | 24,808 | 1,048,486 |

| Miscellaneous Physical Properties | | |
|---|---|---|
| ASTM D4060 Loss (mg) | % Glass (wt.) | Density (g/cm³) |
| XM10024-97-1    256 | 34.09 | 1.34 |
| XM10024-97-2    1803 | 46.49 | 1.06 |

Sample Plaque Composition:

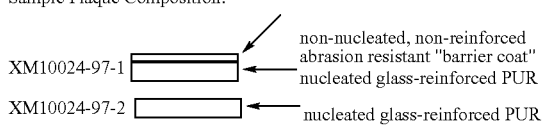

XM10024-97-1 ← non-nucleated, non-reinforced abrasion resistant "barrier coat" / nucleated glass-reinforced PUR XM10024-97-2 ← nucleated glass-reinforced PUR FIGS. 9a-9e and 10a-10b illustrate an alternate or modified embodiment. This embodiment includes a modified interconnecting arrangement which uses partially imbedded metal hooks. Thus, in FIGS. 9a-9e there is shown a generally arcuate chute section 212 with central longitudinal reinforcing rib 214 with generally open channel shape 216 flanking the open arcuate shape extending along the longitudinal edges thereof. Each of the channel shapes is provided with a hook device 218 at one end and a hook receiving opening or socket 220 at the other. As seen particularly in FIGS. 9e, 10a and 10b, the hook element is a separate member having a shape that enables it to be captured and partial imbedded or encapsulated in a molded channel shape as shown at 222 in FIG. 9c. The encapsulated portion of hook members 218 may be shaped to impart the desired protrusions 236 and recesses 238 to the molded channel members 216 as in FIG. 9d so that the stacking arrangements of 6a-6c may be maintained. Indentations such as at 240, 242 and 246 help anchor the hooks in the channel shapes. A flange 248 separates a protruding hook end 250 from the imbedded section 252.

Chutes of the embodiment of FIGS. 9a-9e and 10a-10b may be made of any of the materials mentioned above as desired. The separate hook members may also be made of any suitable material, but are preferably of metal, such as steel or aluminum, to add durability to the interconnecting function of the chute sections while adding a minimum of weight to the assembly. The hook members may be fabricated using any known technique applicable to the material used including casting, machining, etc.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A multi-section chute of a type suitable for directing mixed concrete compositions from a discharge end of a concrete mixer to a desired receiving location, comprising:
   (a) a plurality of elongate generally arcuate chute sections fabricated from one or more polymeric materials, each having a wall with a low friction concave inside surface configuration and a convex outer configuration wherein each said chute section includes a pair of flanking longitudinal channel shapes along and integral to longitudinal edges of said wall and a central longitudinal rib, said channel shapes and said rib re-enforcing said chute section against longitudinal bending, and a fastening assembly for removably joining each of said plurality of chute sections together in a consecutive longitudinal arrangement;
   (b) wherein said plurality of elongate chute sections further comprise interlocking cooperating nesting/stacking configurations that enable formation of a compact stable interconnecting nesting stacked storage arrangement; and
   (c) wherein said fastening assembly comprises a dual hook and pocket pin arrangement which includes separate hook members partially embedded in said longitudinal channel shapes.

2. A multi-section chute as in claim 1 wherein said central rib is a fiber reinforced polymer structure.

3. A multi-section chute as in claim 2 including glass reinforcing fibers.

4. A multi-section chute as in claim 1 wherein said chute sections comprise an inner and/or outer layer selected from non-reinforced and reinforced polymers with low coefficient of shrinkage and high abrasion resistance.

5. A multi-section chute as in claim 1 wherein said polymer is selected from the group consisting of polyurethanes, thermoplastic polymers, including acrylics, thermoformable sheets, vinyl ester polyurethane hybrids, epoxy/polyurethane hybrids and polyamides.

6. A multi-section chute as in claim 1 wherein said chute sections comprise fiber reinforced polymer material.

7. A multi-section chute as in claim 6 wherein said polymer is selected from polyurethanes and polyamides.

8. A multi-section chute as in claim 7 wherein said fibers are short glass fibers.

9. A multi-section chute as in claim 6 wherein said fibers are short glass fibers.

10. A multi-section chute as in claim 1 wherein the concave surface of the chute sections leave a surface roughness less than 500 microinches.

11. A multi-section chute as in claim 1 wherein the inside surface roughness is between about 10 and about 200 microinches.

12. A multi-section chute as in claim 1 wherein said longitudinal channel shapes are side moldings.

13. A multi-section chute as in claim 1 wherein said longitudinal channel shapes extend generally along an entire length of the outside of said longitudinal edges of said chute sections and provide extended hand-hold areas for lifting and manipulating said chute sections.

14. A multi-section chute as in claim 1 wherein said hooks include reinforcing inserts.

15. A multi-section chute as in claim 1 wherein said hook members comprise metal material.

16. A multi-section chute as in claim 15 wherein said hook members comprise a metal selected from aluminum and steel.

17. A multi-section chute as in claim 1 wherein said nesting/stacking configuration further comprises matching recess and protrusion surface features toward a selected end of said channel shapes to position said chute sections in a nested stacked arrangement.

18. A multi-section chute as in claim 17 wherein said nesting/stacking arrangement further comprises matching abutting substantially flat surface areas in the interior and exterior of said chute sections.

19. A multi-section chute as in claim 1 including a plurality of layers including a top wear layer wherein a layer below said top layer is color coded to indicate wear.

20. A multi-section chute of a type suitable discharging material from a source to a desired receiving location, comprising:
   (a) a plurality of elongate non-metallic, generally arcuate chute sections, each having a wall with a low friction concave inside surface configuration and a convex outer configuration wherein each said chute section includes a pair of flanking longitudinal channel shapes along and integral to longitudinal edges of said wall and a central longitudinal rib, said channel shapes and said rib re-enforcing said chute section against longitudinal bending, and a dual hook and pocket fastening assembly for removably joining each of said plurality of chute sections together in a consecutive longitudinal arrangement;
(b) wherein said plurality of elongate chute sections further comprise interlocking cooperating nesting/stacking configurations that enable formation of a compact stable interconnecting nesting stacked storage arrangement;
(c) wherein said longitudinal channel shapes extend generally along an entire length of the outside of said longitudinal edges of said chute sections and provide extended hand-hold areas for lifting and manipulating said chute sections; and
(d) wherein said fastening assembly comprises a dual hook and pocket pin arrangement which includes separate hook members partially embedded in said longitudinal channel shapes.

* * * * *